Feb. 18, 1969 D. P. SLEVIN 3,427,984
TWO-PIECE THRUST PLATE FOR ROTARY PUMPS AND MOTORS
Filed May 25, 1967
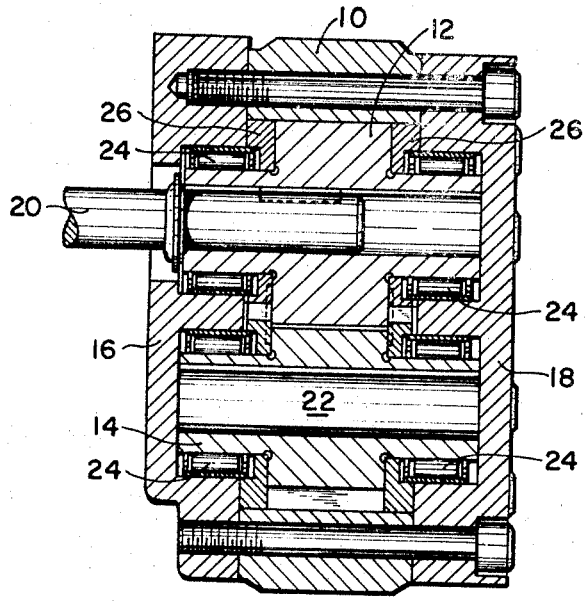
FIG. 1
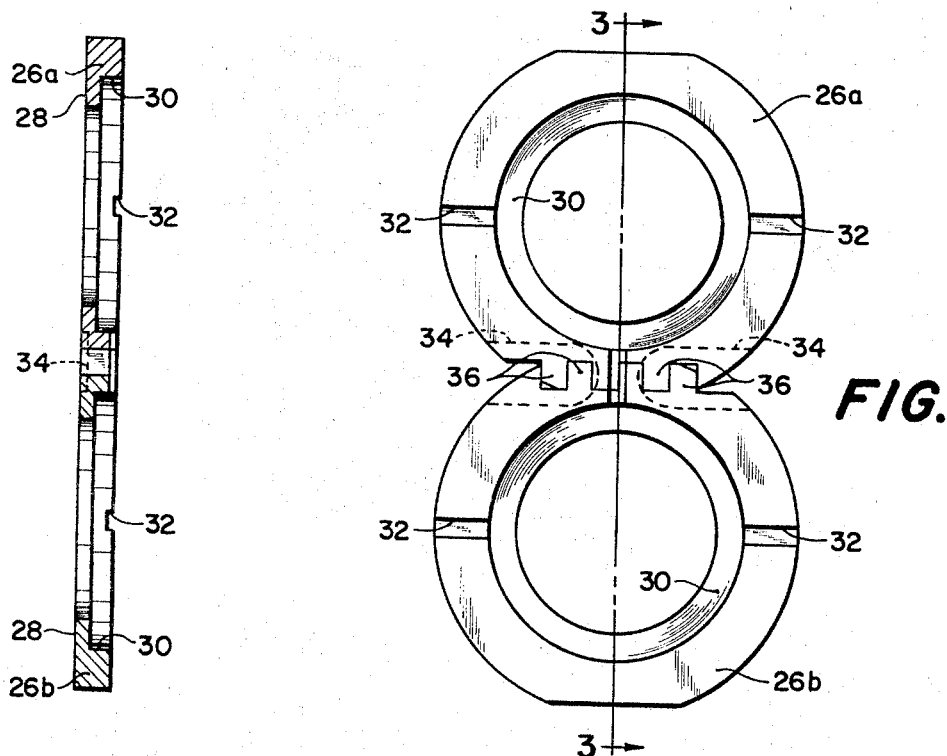
FIG. 2
FIG. 3
INVENTOR.
DENNIS P. SLEVIN
BY
*George Raymovich*
HIS ATTORNEY

United States Patent Office 3,427,984
Patented Feb. 18, 1969

3,427,984
TWO-PIECE THRUST PLATE FOR ROTARY PUMPS AND MOTORS
Dennis P. Slevin, 614 Tartan Drive,
Monroeville, Pa. 15146
Filed May 25, 1967, Ser. No. 641,297
U.S. Cl. 103—126
Int. Cl. F01c 1/28, 21/10
3 Claims

ABSTRACT OF THE DISCLOSURE

A thrust plate for rotary pumps and motors formed in two pieces to ease manufacturing and to permit relative movement of the two pieces. Relative movement prevents warping and binding of the thrust plate upon heating. The two pieces are identical in configuration to each other and the interconnecting portions of the thrust plates form a labyrinth seal to prevent leakage of fluid from inlet port to outlet port of the rotary pump or motor.

Background of invention

In high pressure rotary gear pumps and motors, thrust plates are utilized to bear upon the ends of the rotary gears to prevent leakage of fluid along the ends of the gears and to prevent wear of the ends of the gears.

An example of prior art thrust plates is shown in United States Patent No. 2,982,220 issued to Thomas C. Kane, deceased, on May 2, 1961, and entitled "Thrust Plates for Rotary Pumps and Motors." The thrust plates shown therein are of unitary construction wherein one plate is formed in one piece and that plate abuts both gears of the pump or motor.

Thrust plates of the type shown in the Kane patent have certain inherent disadvantages which are overcome by the thrust plates of the present invention. Primarily, the thrust plates formed in one piece are subjected to heat and distortion under operation of the pump or motor in which they are positioned. When heated, these unitary thrust plates warp or bend sufficiently to cause binding of the pump or motor gears against the thrust plate. This condition results in high friction during operation of the pump or motor, and also accelerates wearing of all parts.

Another disadvantage of the unitary thrust plates is the relative difficulty of manufacture. Because of the unitary construction, with holes for each of the shafts, an awkward manufacturing process results.

Summary

The present invention is directed to producing a novel thrust plate arrangement which overcomes the major disadvantages of the unitary thrust plates. The thrust plates of the present invention are formed from two identical elements. The two elements interfit with each other to form one thrust plate. The two elements may move relative to each other. The thrust plate elements of the present invention may not, however, rotate relative to each other and, for all purposes, produce a unitary thrust plate arrangement without having the disadvantages of the standard unitary thrust plate.

The thrust plate of the present invention, having two relatively circular elements, may be easily manufactured from slices taken from ordinary round stock. Accordingly, the manufacturing process is greatly simplified over that for unitary thrust plates.

The two-piece thrust plate of the present invention is designed to have a labyrinth seal formed between the two thrust plate elements when they are in position within a pump. This labyrinth seal is of unique design, having square teeth which interfit into each other to prevent rotation of the thrust plate elements but yet permit relative movement of the two elements.

With the foregoing considerations in mind, it is an object of the present invention to provide an improved thrust plate for rotary pumps and motors.

Another object of the present invention is to provide a two-piece thrust plate having two identical thrust plate elements.

Another object of the present invention is to provide a thrust plate which is easily manufactured.

These and other objects of the present invention will become apparent as this description proceeds in conjunction with the accompanying drawings:

Description of the drawings

FIGURE 1 is a sectional view through a gear pump showing the thrust plates of the present invention in position.

FIGURE 2 is a plan view of the two-piece thrust plate of the present invention.

FIGURE 3 is a sectional view, taken along line 3—3 of FIGURE 2.

Description of preferred embodiment

Referring to the drawings, there is illustrated a rotary gear pump housing 10, having a pair of meshing gear impellers 12 and 14. The pump housing 10 has end walls 16 and 18 which close the pump casing. Gear impellers 12 and 14 are keyed to shafts 20 and 22, respectively.

The shafts 20 and 22 are journaled for rotation in bearings 24. The bearings 24 are received in enlarged recesses within the pump end walls 16 and 18.

The thrust plates 26 of the present invention are positioned between the gear impellers 12 and 14 and the respective end walls 16 and 18. As best seen in FIGURES 2 and 3, the thrust plates 26 are each formed from two identical thrust plate elements, 26a and 26b.

Since the thrust plate element 26a and thrust plate element 26b, which together form one thrust plate 26, are identical to each other, the description of the thrust plate elements is valid for element 26a or element 26b.

The thrust plate elements 26a and 26b each have a gear engaging surface 28 which contacts the end of the respective gear impeller 12 or 14. Behind the gear engaging surface 28 is formed a bearing recess 30 into which the bearings 24 of the gear pump protrude.

Each thrust plate element, 26a and 26b, has seal grooves 32 formed therein. The seal grooves are adapted to receive rubber seals (not shown) which act to contact the respective gear end walls 16 and 18. These seals act to form differential pressure areas on the rear face of the thrust plate elements 26a and 26b which maintain the thrust plate elements in desired contact with the ends of the gear impellers 12 and 14.

The thrust plate elements 26a and 26b also have port grooves 34 formed therein which tend to enlarge the entry port and exit port areas of the gear pump housing.

As best shown in FIGURE 2, each of the thrust plate elements, 26a and 26b, has square teeth 36 formed thereon. At least three teeth 36 are formed on each element 26a and 26b.

When viewing FIGURE 2, it will be seen that if thrust plate element 26a were rotated 180°, it would be in the position of thrust plate element 26b. The identical thrust plate elements, 26a and 26b, then mesh so that the teeth 36 of element 26a fit between the teeth 36 of thrust plate element 26b.

The teeth 36 on thrust plate elements 26a and 26b combine to form a labyrinth seal which prevents passage of fluid from the entry port to the exit port of the gear pump.

Since the thrust plate elements 26a and 26b are identical, the labyrinth seal formed at their connection is at the place of the intermeshing of the rotary gears 12 and 14 of the gear pump. The labyrinth seal connection of the thrust plate 26 of the present invention permits the two thrust plate elements 26a and 26b to move relative to each other but prevents the two elements from rotating relative to each other about the shafts 20 and 22.

As best seen in FIGURE 2, each of the thrust plate elements 26a and 26b are generally circular in shape and have the toothed portion created by teeth 36 within the outer diameter of the generally circular configuration of the elements. Accordingly, these elements 26a and 26b may be manufactured from standard circular stock by slicing the standard circular stock and forming the teeth therein. This method of manufacture results in a great saving of material and also eases the manufacturing process for the thrust plate elements of the present invention.

According to the provisions of the patent statutes, I have explained the principle, preferred construction, and mode of operation of my invention and have illustrated and described what I now consider to represent its best embodiment. However, I desire to have it understood that, within the scope of the appended claims, the invention may be practiced otherwise than as specifically illustrated and described.

I claim:
1. A two-piece thrust plate for rotary pumps and motors that have a casing with inlet and outlet ports therein, a pair of rotary gears intermeshing within said casing on shafts rotatable relative to said casing, and fluid chambers about the periphery of said gears, said thrust plate comprising:
   (a) a first thrust plate element;
   (b) a second thrust plate element;
   (c) each of said elements having a circular opening therein to rotatably receive one gear shaft;
   (d) a portion of each of said first and second elements interfitting with each other to form a labyrinth seal, said labyrinth seal interconnecting said first and second thrust plate elements at the place of intermeshing of said rotary gears, said labyrinth seal being formed by at least three interfitting teeth on each element, said teeth being of square configuration wherein the sides of said teeth are parallel to an imaginary line connecting the centers of said element circular openings;
   (e) the construction of said thrust plate labyrinth seal connection permitting relative movement of said thrust plate elements toward and away from each other but preventing relative rotation of said thrust plate elements about said shafts.

2. The two-piece thrust plate of claim 1 wherein the relative movement permitted by the construction of said seal connection prevents heat distortion and binding of said thrust plate while in said pump or motor.

3. The two-piece thrust plate of claim 1 wherein individual thrust plate elements may be replaced without loss of pump or motor efficiency.

References Cited

UNITED STATES PATENTS

| | | | |
|---|---|---|---|
| 621,280 | 3/1899 | Pitt | 103—126 |
| 2,706,452 | 4/1955 | Hilton | 103—126 |
| 2,915,981 | 12/1959 | Norlin | 103—126 |
| 2,972,959 | 2/1961 | Wilson et al. | 103—126 |
| 3,002,464 | 10/1961 | Lee | 103—126 |
| 3,251,309 | 5/1966 | Schmiel et al. | 103—126 |

FOREIGN PATENTS

| | | |
|---|---|---|
| 1,006,722 | 4/1957 | Germany. |
| 370,214 | 4/1932 | Great Britain. |

ROBERT M. WALKER, *Primary Examiner.*

WILBUR J. GOODLIN, *Assistant Examiner.*

U.S. Cl. XR.

103—216